United States Patent [19]

Hajek et al.

[11] 4,218,289

[45] Aug. 19, 1980

[54] DISTILLATION APPARATUS WITH A GRID PARTIAL CONDENSER

[75] Inventors: James D. Hajek, Houston; Earl E. McReynolds, LaPorte, both of Tex.

[73] Assignee: The Upjohn Company, Kalamazoo, Mich.

[21] Appl. No.: 664,762

[22] Filed: Mar. 8, 1976

[51] Int. Cl.² .............................................. B01D 3/16
[52] U.S. Cl. .................................................... 202/161
[58] Field of Search ................... 202/161, 158, 185 R, 202/198; 196/99, 100; 203/87; 165/110; 62/272, 290, 288

[56] References Cited

U.S. PATENT DOCUMENTS

| | | | |
|---|---|---|---|
| 1,541,912 | 6/1925 | Barbet | 202/161 |
| 1,789,072 | 1/1931 | Herthel | 196/99 |
| 2,341,281 | 2/1944 | McGovern | 202/161 |
| 2,415,411 | 2/1947 | Bowman | 202/158 |
| 2,670,611 | 3/1954 | Fagerberg | 62/290 |
| 3,244,600 | 4/1966 | Sinex | 196/99 |
| 3,306,071 | 2/1967 | Holyfield | 62/290 |
| 3,501,382 | 3/1970 | Roe | 202/185 |

Primary Examiner—Hiram H. Bernstein
Attorney, Agent, or Firm—Denis A. Firth; John Kekich

[57] ABSTRACT

An improved fractional distillation column, especially adapted for use in fractional distillation of heat-sensitive materials under low pressure, is described. The improvement comprises a partial condenser disposed above the packing in the column. The partial condenser is a grid of hollow tubes mounted horizontally and extending through the side walls of the column. Heat exchange fluid at controlled temperature lower than the outer condensing vapor temperature is circulated through the tubes. The outer surfaces of the tubes within the column are provided with drip sites to facilitate uniform distribution of condensed liquid falling from condenser tubes to the packing below.

10 Claims, 9 Drawing Figures

FIG. I

FIG. 2
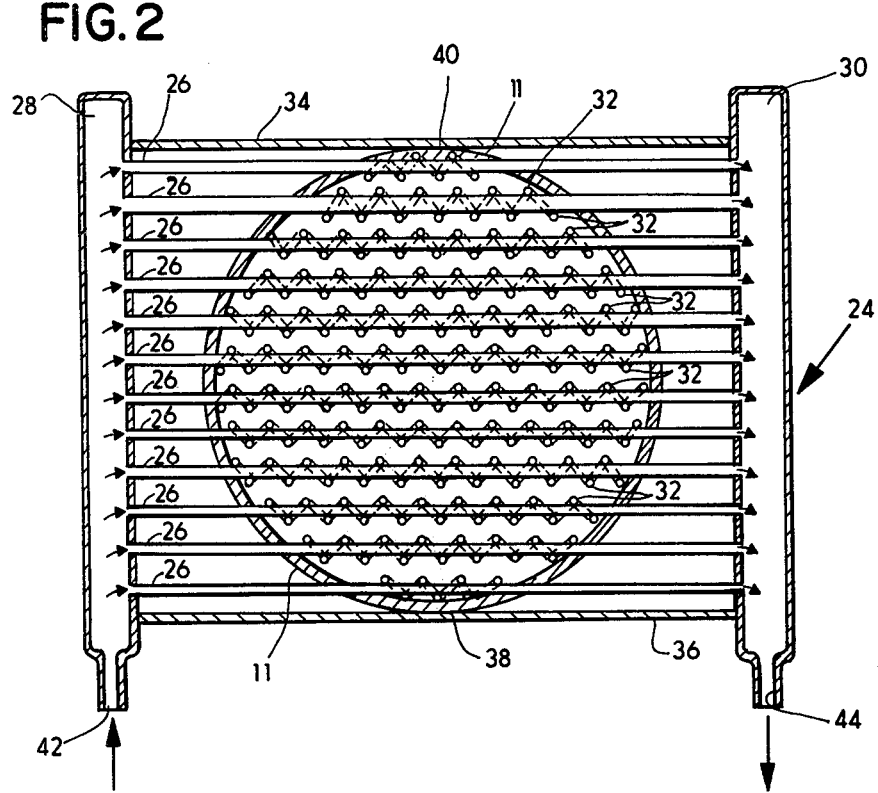
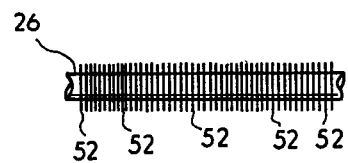
FIG. 6
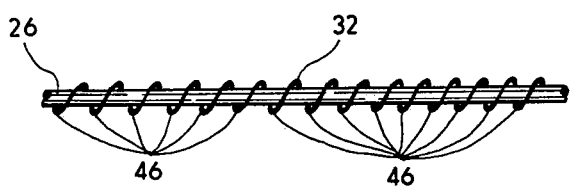
FIG. 3
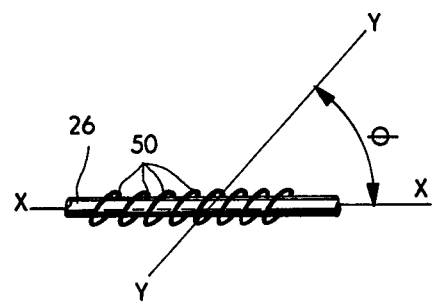
FIG. 5
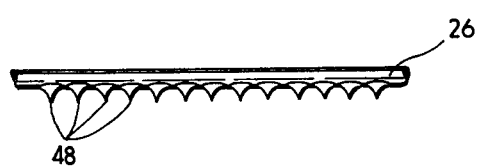
FIG. 4

DISTILLATION APPARATUS WITH A GRID PARTIAL CONDENSER

BACKGROUND OF THE INVENTION

1. Field of the Invention

This invention relates to improved fractional distillation columns and is more particularly concerned with fractional distillation columns employed in the distillation of heat sensitive materials at low pressures.

2. Description of the Prior Art

Fractional distillation columns, conventionally employed in the art for the fractionation of liquid materials on a large scale, generally comprise a vertical column containing a layer of packing, which can take a variety of forms such as glass or porcelain rings, tubes, helices, and the like, and which is the principal means by which intimate contact is ensured between the liquid phase passing down the column and vapor passing up the column.

The preheated, vaporized feed material is introduced into the column generally at a location in the midsection. Vapor passes upwardly through the column and exits from the head, usually via a reflux condenser, while material in the liquid phase passes down the column, countercurrently to ascending vaporized material, and exits at the base where it enters a reboiler from which vaporized material is constantly fed back into the column.

Difficulties are encountered when such columns are applied to the fractional distillation of heat sensitive materials particularly those which have to be distilled under pressure lower than atmospheric. Examples of such materials are aromatic isocyanates such as toluene diisocyanate, diphenylmethane diisocyanate and the like. Thus, for example, the reflux material condensed in head of the column is generally returned, in the conventional type of column, to the packed section via a series of weirs and redistributors which seek to ensure that the liquid be substantially evenly distributed over the surface of the packing. In the passage over the weirs, redistributors and the like, the material is in prolonged contact with the hot surfaces of the devices in question. When the material is heat sensitive, the prolonged contact with the hot surfaces can result in degradation which promotes the formation, and gradual buildup, of deposits. This not only leads to undesirable loss of valuable material, but can result in plugging of the weirs and redistributors necessitating shutdown of the column for cleaning purposes.

Further, unless the redistributors have a very high degree of efficiency, the refluxing material will not be evenly distributed over the packing in its descent down the column. This can result in "dry" spots occurring in the packing with resultant overheating and a tendency for liquid material, which later comes into contact with the overheated spots, to degrade. Again, deposition of solid by-product and clogging of the packing can occur.

The buildup of deposits and clogging or weirs, redistributors, packing and the like in the above manner can also result in development of pressure gradients within the column which can be a serious problem in distillation under extremely low pressure since the performance of the column is drastically reduced.

We have now found that these problems, encountered in the fractional distillation of heat-sensitive materials under high vacuum conditions, can be substantially eliminated by means of a simple but elegant device which we believe to be hitherto unknown in the art in this particular combination.

SUMMARY OF THE INVENTION

This invention comprises an improved fractional distillation column provided with an inlet port for introduction of feed, an exit port in the head of said column for removal of volatile overhead, an exit port in the base of said column for removing liquid bottoms, and packing disposed in at least part of said column; wherein the improvement comprises a partial condenser disposed in said column above the upper surface of said packing and below the said exit port in the head of said column, said partial condenser comprising;

a grid comprised of a plurality of substantially uniformly spaced hollow tubes;

said hollow tubes having their longitudinal axes in parallel relationship and disposed in a plane perpendicular to the vertical axis of said column;

the ends of each of said hollow tubes extending through the sidewalls of said column to the exterior of the latter and each of said ends being connected to fluid reservoir means located on the exterior of said column;

means for circulating heat exchange fluid through the interior of said tubes and said reservoir means;

means for controlling the temperature of said heat exchange fluid; and liquid runoff means installed in a plurality of locations on the outer surface of that portion of each of said hollow tubes which is located within said column.

BRIEF DESCRIPTION OF THE DRAWINGS

FIG. 2: is a view in cross-section of the partial condenser taken along lines 2A—2A of FIG. 1.

FIG. 3: is a partial view, in perspective, of a detail of a partial condenser in accordance with the invention.

FIG. 4: is another partial view, in perspective, of a detail of an alternate embodiment of a partial condenser in accordance with the invention.

FIG. 5: is yet another partial view, in perspective, of a detail of an alternative embodiment of a partial condenser in accordance with the invention.

FIG. 6: is yet another partial view, in perspective, of a detail of an alternative embodiment of a partial condenser in accordance with the invention.

DETAILED DESCRIPTION OF THE INVENTION

Figure 1:
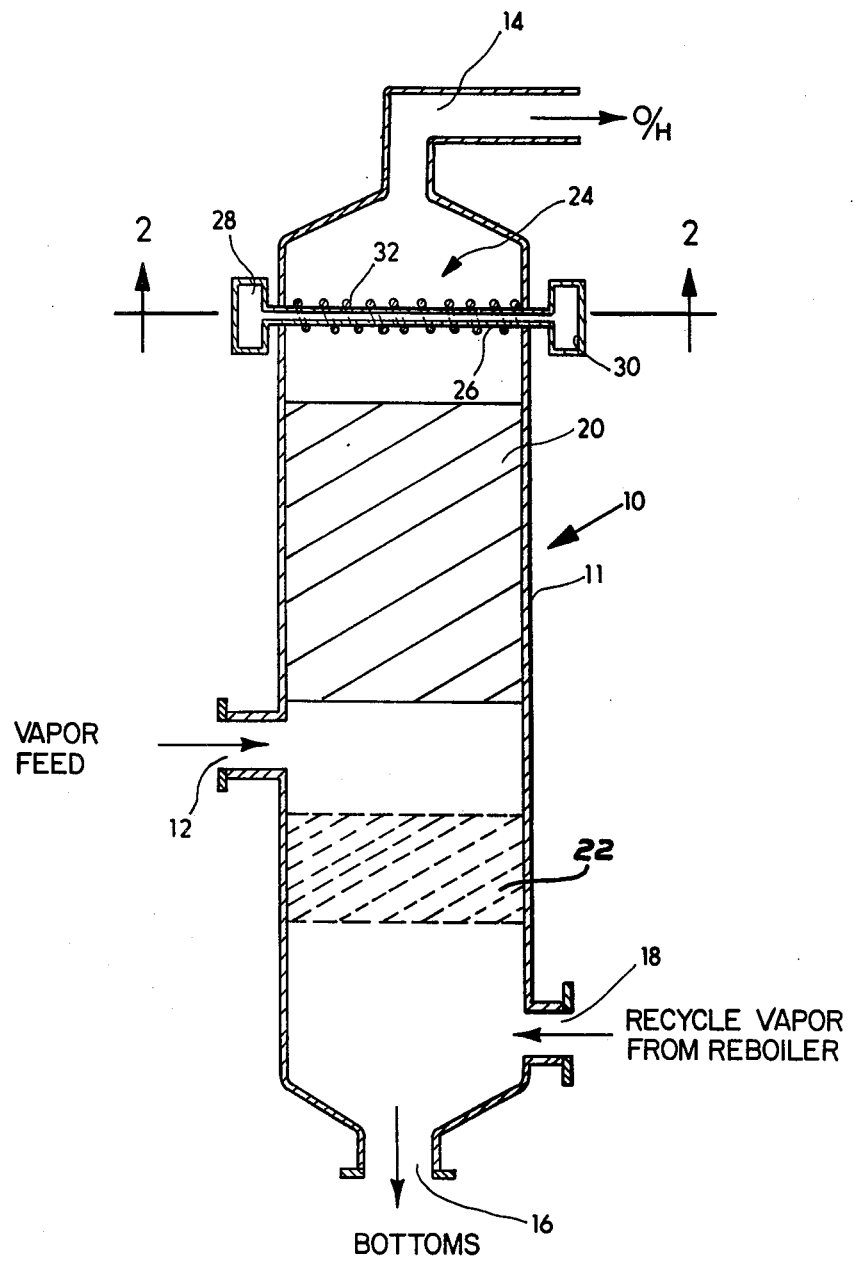
FIG. 1: is a schematic representation of a cross-sectional view taken along the vertical axis of a typical fractionation column with a partial condenser in accordance with the invention.

Fractional distillation columns generally comprise a cylindrical housing mounted on its vertical axis and provided with means in the mid-section for introducing the feed material in vapor form, means in the head of the column housing for removing the volatile overhead, means in the base of the column housing for removing liquid bottoms fraction and means in the lower section of the column for returning volatile material from a reboiler associated with the fractioning column. At least part of the interior of the column is packed with one or more layers of material such as glass, metal or ceramic beads, helices, rings, saddles and the like. The packed section (or sections) provides an area in which liquid material descending the column can come into intimate contact with vapor ascending the column. Reflux condenser means are generally incorporated in the head of the column so that a portion of the volatile overhead in condensed and returned in the liquid form. In order to distribute the liquid so condensed in a relatively uniform manner over the packing in the column, a series of weir boxes, orifice plates or like liquid distributor means are generally provided.

While the above type of column operates satisfactorily for the fractional distillation of the majority of liquid materials which have relatively low boiling points and are not subject to degradation on prolonged exposure to heat, a number of difficulties arise when such columns are employed in the fractional distillation of heat sensitive liquids. These difficulties have been discussed at length hereinabove.

We have now found that the above difficulties can be overcome, or at least minimized to a highly satisfactory degree, by the use of a device which serves a dual role or partial reflux condenser and liquid distributor. This device can be installed in the upper section of any packed fractional distillation column, but is particularly useful when installed in a fractional distillation column which is to be operated under relatively high vacuum.

The device in question comprises a grid formed of hollow tubes advantageously having an outside diameter within the range of about ½ inch and about 1½ inches and preferably within the range of about ¾ inch to about 1 inch. The grid is formed of one or more layers of said tubes, the tubes in any one layer being arranged substantially symmetrically with their longitudinal axes in parallel, and approximately equidistant, relationship. When there are more than two layers of tubes in the grid, the tubes in the one layer are arranged in a plane parallel to, and with their longitudinal axes in the same direction as, those in the other layer or layers, with adjacent layers staggered so that liquid from a given layer does not drip on tubes in the adjacent lower layer.

The grid is installed in the upper section of the distillation column, above the upper surface of the packing in the column and below the exit port for volatile overhead, in such a manner that the layer of tubes, or each layer of tubes therein, are disposed horizontally, i.e. the longitudinal axes of the tubes are disposed in a plane or planes at right angles to the vertical axis of the column. Each tube in the grid is installed in the column so that the ends project through the sidewalls of the column to a position on the outside of said column. The opposite ends of each tube communicate with one or more liquid reservoirs appropriately disposed on the exterior of the column. Preferably, there are at least two such reservoirs located one on each side of the column, the ends of the tubes emerging on the one side all communicating with the reservoir located on that side and the opposite ends of each of the said tubes communicating with the reservoir on the other side of the column. Heat exchanger fluid, such as monochlorobenzene, dichlorobenzene, cooling water, heat transfer fluids and the like, can be circulated through each of the tubes by pumping the fluid into the one reservoir via an inlet port and withdrawing fluid from the other reservoir via an exit port for recirculation. The temperature of the fluid which is circulated in this manner is controlled at any desired level by appropriate heating and thermostat devices with a relatively low tubeside temperature rise per tube pass to promote even condensation across the tube length. The tubeside temperature rise per pass should preferably be less than 20 percent of the mean temperature difference between column vapor and tubeside fluid temperature.

The fluid reservoirs can take various configurations. For example, the reservoirs can be cylindrical tanks with their longitudinal axes disposed horizontally. The tanks can be linear or can be curved to conform to the shape of the outer wall of the column. If desired, more than one pair of reservoirs can be employed to provide circulation of fluid through the tubes. For example, fifty percent of the tubes in the grid can be served by means of a pair of fluid reservoirs equipped with fluid recirculation means and the remainder of the tubes can be served by a second pair of fluid reservoirs or a suitably baffled single pair of reservoirs on each end.

The portions of each of the tubes in said grid which are located in the interior of the distillation column have liquid runoff or drip means provided on the outer surfaces thereof. Said means can be any such means known in the art which promote the draining of condensed liquid from a surface. A preferred form of such means are continuous or segmented helical coils encircling the outer surface of the tubes and disposed in substantially symmetrical arrangement through the length of the tubes within the column. Other such liquid runoff means include beads, nipples, pins, and the like located on the lower surface of the tubes and arranged symmetrically along the length of the tubes within the column. Any combination of two or more of such drip means can be employed, if desired, provided that the totality of such drip means throughout the grid is so arranged that a substantially uniform pattern and volume of drops will fall from the underside of the grid when the column is in operation.

Various embodiments of the apparatus of the invention will now be described by reference to the accompanying drawings.

FIG. 1 shows a schematic, cross-sectional view of a typical fractional distillation column (10) having an inlet port (12) for introduction of feed, an exit port (14) for removal of volatile overhead, and exit port (16) for removal of bottoms and an entry port (18) for introduction of recycle vapor from a reboiler (not shown). If desired, the column (10) can also be provided with a heating jacket (not shown) through which oil or like fluid is circulated at any desired controlled temperature to reduce column heat losses. A packed section (20) is provided in the portion of the interior of the column (10) between the vapor feed entry port (12) and the overhead exit port (14). A second packed section (22), shown in dotted lines, is optionally provided in the lower section of the column between the vapor feed entry port (12) and the recycle vapor port (18). The partial condenser (24) is shown in cross-section mounted in the head of the column (10) between the upper surface of the packed section (20) and the overhead exit port (14). The hollow tubes (26), of which one is shown in cross-section in FIG. 1, project through the wall of the column housing (11) and communicate at one end with the fluid reservoir (28) and at the other end with a second fluid reservoir (30). A continuous helical coil (32) is mounted coaxially on and snugly fitted to each of tubes (26) and extends for the whole of the length of each of the latter which is located within the interior of the column (10).

The partial condenser (24) is shown in more detail in FIG. 2 which is a cross-sectional view taken along lines 2A—2A of FIG. 1. It will be seen that the particular embodiment of the partial condenser (24) shown in FIG. 2 takes the form of a rectangular grid, two opposite sides of which are formed by the fluid reservoirs (28) and (30) and the other two opposite sides of which are formed by the two outermost of the hollow tubes (26). Brace members (34) and (36) serve to hold the fluid reservoirs (28) and (30) in place on the exterior of the column housing (11), said brace members being secured, by means of welds, bolts, brackets and the like, to said column housing (11) at points (38) and (40). Each of the hollow tubes (26) has one end connected in fluid-tight manner, as by welding and like means, to the fluid reservoir (28) and has the other end connected in the same manner to the other fluid reservoir (30), the interior of each of said tubes communicating directly with the interior of each of said reservoirs.

Heat exchange fluid is introduced, by appropriate pump means and piping into fluid reservoir (28) via inlet port (42) and said fluid passes via said reservoir (28) through the interior of the tubes (26) to the second reservoir (30) from which the fluid is withdrawn via exit port (44). The fluid is then recirculated through appropriately controlled cooling means (not shown) to the entry port (42) in reservoir (28). In this manner the temperature of the fluid passing through the tubes (26), and hence the outer surface temperature of said tubes which are exposed within said column (10), is controlled so as to achieve any desired rate of condensation of vapor in the head of column (10) when the latter is being operated.

Each of said hollow tubes (26) traverses a section of the interior of the upper part of said column (10). The locations at which each of said hollow tubes (26) pass through the wall of the column housing (11) are sealed in fluid and pressure tight manner as by welding or other appropriate means. That portion of the outer surface of each of said tubes (26) which is within the interior of said column (10) is provided throughout its length with a plurality of liquid drip forming means. In the embodiment illustrated in FIG. 2 the liquid drop forming means take the form of continuous helical coils (32) which are fabricated from metal, glass or the like material. Said coils (32) are each disposed coaxially with, and surrounding, the particular tube (26) with which they are associated. Preferably the coils (32) are in contact with the outer surface of the tubes (26) throughout the entire length of the coils (32). Optionally, but not necessarily, the coils (32) are secured to the outer surface of the tubes which they embrace by appropriate means such as spot welding and the like.

The tubes (26) are preferably arranged in a symmetrical manner, i.e. with each tube (26) substantially equidistant from its two adjoining neighbors, and the drip forming means installed on the portion of each tube within the column are also preferably disposed in a symmetrical manner, i.e. spaced equidistantly along the individual tubes. In this manner, the partial condenser (24), when operating in the column (10) in a fractional distillation, will provide a uniform pattern of drops of condensate falling from the drip forming means of said partial condenser to the surface of the packing (20) situated below the partial condenser.

In further illustration of this feature of the partial condenser (24) there is shown in FIG. 3 a perspective view of a section, within the interior of column (10), of a hollow tube (26) with helical coil (32) installed thereon as shown in cross-section in FIG. 2. The various points (46), being the lowermost points on said helical coil (32), are the sites to which fluid condensing on said tube (26) flows and forms droplets which then fall under gravity downwardly in the column (10). As will be apparent to one skilled in the art, any desired pattern of droplets can be achieved by appropriate adjustment of the distance between the drip sites (46), i.e. by adjusting the number of turns per unit length in the coil (32).

In FIG. 4, there is shown a perspective view of a section, within the interior of column (10), of a hollow tube (26) with an alternative drip forming means, namely, a plurality of nipples (48) mounted on the underside thereof. The configuration of the nipples (48), and the number per unit length of the tube (26), can be adjusted as desired to achieve any particular pattern of drops of condensed liquid falling from the underside of the tube (26).

In FIG. 5, there is shown a perspective view of a section, within the interior of column (10), of a hollow tube (26) with yet another alternative drip forming means installed thereon, namely, a plurality of individual elliptical or circular bands (50) which encircle the exterior of the tube (26) and are in contact with the surface of the latter. Preferably, the angle $\theta$ made by the major axis (extrapolated as Y-Y in FIG. 5) of the bands (50) to the longitudinal axis (X—X) of the tube (26) is not more than 45°.

In FIG. 6, there is shown a perspective view of a section, within the interior of column (10), of a hollow tube (26) with yet another alternative drip forming means installed thereon, namely, a plurality of fins (52), cut or otherwise formed on the exterior surface of said tube (26). The depth and configuration of said fins (52) as well as the number per unit length can be adjusted as desired to achieve any particular pattern of drops of condensed liquid falling therefrom.

The various embodiments of the partial condenser described hereinabove have shown only a single layer of hollow tubes (26) forming the grid of said condenser. However, it will be apparent that two or more layers of hollow tubes can be provided if desired. Each additional layer will be disposed in a horizontal plane parallel to, and either above or below, the plane of the neighboring layer or layers. The longitudinal axes of the tubes in any one layer can be parallel to those in neighboring layers or can be set at any angle thereto. However, it is obviously desirable, when two or more layers of hollow tubes, each with its plurality of drip forming means discussed above, are employed, that the drip means on the tubes in the various layers are so disposed that the drip points in the upper of two adjacent layers are so disposed that liquid falling therefrom can pass freely between the spaces between the tubes in the lower layer.

Figure 7:
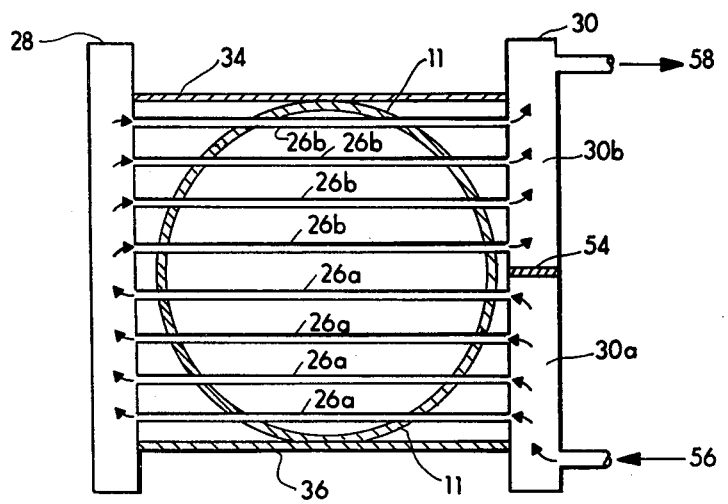
FIGS. 7, 8 and 9 show, in cross-sectional plan view, alternative embodiments of partial condensers in accordance with the invention.

Referring now to FIG. 7, there is shown in schematic form a cross-sectional view of an alternative form of partial condenser in accordance with the invention. In this embodiment the fluid reservoir (30) is divided into two compartments by means of a fluid tight baffle plate (54). Heat exchange fluid enters the section (30a) of reservoir (30) via inlet port (56), passes through tubes (26a) to the second reservoir (28) and is returned to section (30b) of reservoir (30) via tubes (26b) and finally exits via exit port (58). For the sake of simplicity the drip means on tubes (26a) and (26b) are not shown in FIG. 7 but it is to be understood that any of the drip means illustrated in FIGS. 2–6 can be employed in the embodiment shown in FIG. 7.

Figure 8:
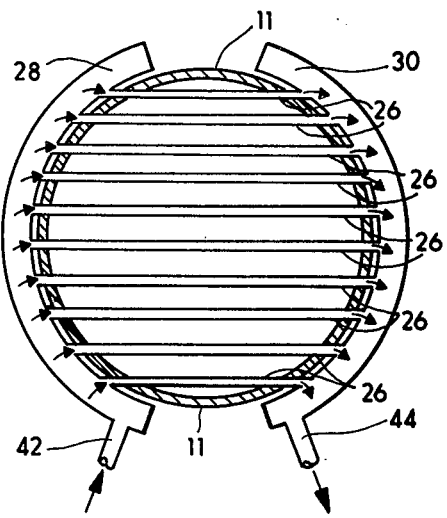

FIG. 8 shows, in cross-sectional view, an alternative form of the embodiment shown in FIG. 2 of a partial condenser in accordance wih the invention. In the embodiment shown in FIG. 8 the fluid reservoirs (28) and (30) are curved to conform substantially to the curvature of the outside of the column housing (11). The drip means on tubes (26) are not shown in FIG. 8 but it is to be understood that any of the drip means illustrated in FIGS. 2–6 can be employed in the embodiment shown in FIG. 8.

Figure 9:
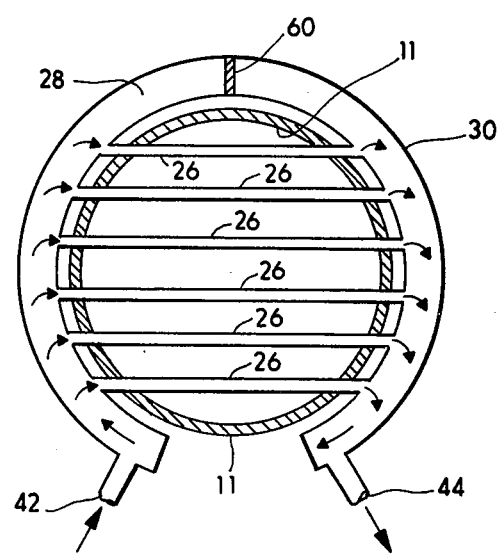

FIG. 9 illustrates, in cross-sectional view, a further alternative form of the embodiment shown in FIG. 2 of a partial condenser in accordance with the invention. In the embodiment shown in FIG. 9 the fluid reservoirs (28) and (30) form a single continuous vessel curved to conform substantially to the curvature of the outside of the column housing (11) and extending almost completely around the exterior of said column housing (11). The reservoirs (28) and (30) are isolated from each other by means of fluid tight baffle plate (60). Heat exchange fluid enters reservoir (28) via inlet port (42), passes through tubes (26) to reservoir (30) and exits via exit port (44). The drip means on tubes (26) are not shown in FIG. 9 but it is to be understood that any of the drip means illustrated in FIGS. 2–6 can be employed.

The improved fractional distillation column in accordance with the invention can be applied to the fractionation of any liquid mixture at atmospheric pressure as well as under reduced pressure. However, the improved fractionation column of the invention exhibits its advantages to the fullest extent when applied to the fractional distillation of mixtures of heat sensitive liquids which have relatively high boiling points and which therefore require high vacuum conditions for distillation. Exemplary of such materials are polyisocyanates particularly aromatic isocyanates such as 2,4-toluene diisocyanate, 2,6-toluene diioscyanate and mixtures thereof, 2,2'-, 2,4'- and 4,4'-methylenebis(phenyl isocyanate) and mixtures thereof, 2,2'-, 2,4'- and 4,4'-methylenebis(phenyl amine), fatty acids, polyalcohols, phenols, phthalates, and the like. Thus the improved fractional distillation column of the invention, when applied to the distillation of such materials under high vacuum overcomes the difficulties, discussed hereinbefore, which arise by reason of deposition of solid degradation products on liquid distributors hitherto employed in the art, as well as deposition of solid degradation products in the column packing. Further the design of the partial condenser in the distillation columns of the invention is such that no significant pressure drop is encountered across the condenser thus enabling maintenance of high vacuum in the system.

Other advantages of the novel comination of partial condenser and fractionation column in accordance with the invention include highly efficient and uniform distribution of condensed liquid falling on to the upper surface of the column packing, greatly facilitated control of the rate of condensation by variation in temperature of the heat exchange fluid flowing through the condenser, low residence time of condensed liquid on the surface of the condenser, and absence of locations on the surface of the condenser at which liquid buildup can occur, and which could lead to buildup of deposits.

While the novel apparatus of the invention has been described above with reference to certain specific embodiments thereof, it is to be clearly understood that these embodiments have been given for purposes of illustration only and are not intended to be limiting. The scope of the invention is bounded only by the scope of the claims which are set out hereafter.

We claim

1. In a fractional distillation column provided with an inlet port for introduction of feed, an exit port in the head of said column for removal of volatile overhead, an exit port in the base of said column for removing liquid bottoms, and packing disposed in at least part of said column; the improvement which comprises a partial condenser disposed in said column above the upper surface of said packing and below the said exit port in the head of said column, said partial condenser comprising:

a grid comprised of a plurality of substantially uniformly spaced linear hollow tubes;

said hollow tubes having their longitudinal axes in parallel relationship and disposed in a plane perpendicular to the vertical axis of said column;

the ends of each of said hollow tubes extending through the side walls of said column to the exterior of the latter and being connected to fluid reservoir means located on the exterior of said column;

means for circulating heat exchange fluid through the interior of said tubes and said reservoir means;

means for controlling the temperature of said heat exchange fluid; and liquid runoff means installed in a plurality of locations on the outer surface of that portion of each of said hollow tubes which is located within said column.

2. A fractional distillation column according to claim 1 wherein the liquid runoff means of said partial condenser are continuous helical coils coaxial with said hollow tubes.

3. A fractional distillation column according to claim 1 wherein the liquid runoff means of said partial condenser are nipples installed on the lower outer surface of each of said hollow tubes.

4. A fractional distillation column according to claim 1 wherein the liquid runoff means of said partial condenser are fins.

5. A fractional distillation column according to claim 1 wherein the liquid runoff means of said partial condenser are individual rings embracing said hollow tubes and having their major axes inclined to the horizontal.

6. A fractional distillation column according to claim 1 wherein said partial condenser has two reservoir means disposed symmetrically on the exterior of said column, one end of each of said hollow tubes communicating with the first of said reservoir means and the opposite end of each of said tubes communicating with the other of said reservoir means.

7. A fractional distillation column according to claim 1 wherein the hollow tubes in said partial condenser are all disposed in a single plane which is perpendicular to the vertical axis of said column.

8. A fractional distillation column according to claim 1 wherein the hollow tubes in said partial condenser are disposed in at least two different planes parallel to each other and perpendicular to the vertical axis of said column.

9. A fractional distillation column according to claim 1 wherein the periphery of said partial condenser grid is substantially rectangular in shape.

10. A fractional distillation column according to claim 1 wherein the periphery of said partial condenser grid is substantially circular in shape.

* * * * *